July 31, 1934.  G. E. MEGOW  1,968,534
APPARATUS FOR USE IN LOCATING POINTS OF MAXIMUM OR MINIMUM TEMPERATURES
Filed May 10, 1928   2 Sheets-Sheet 2
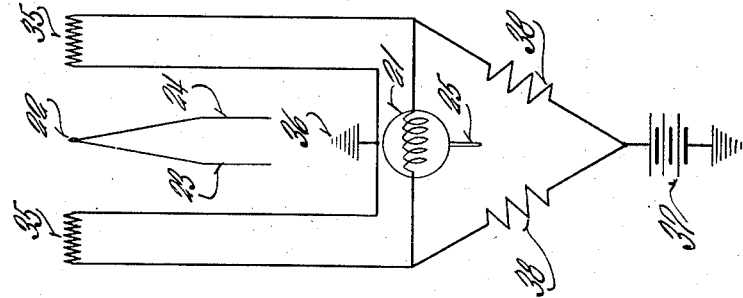
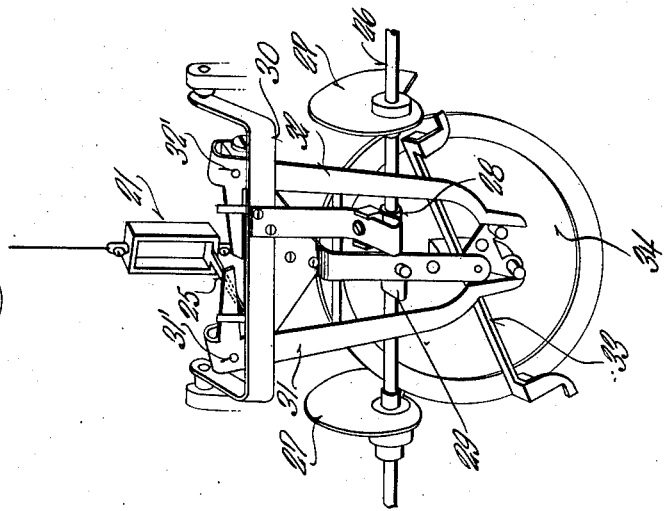
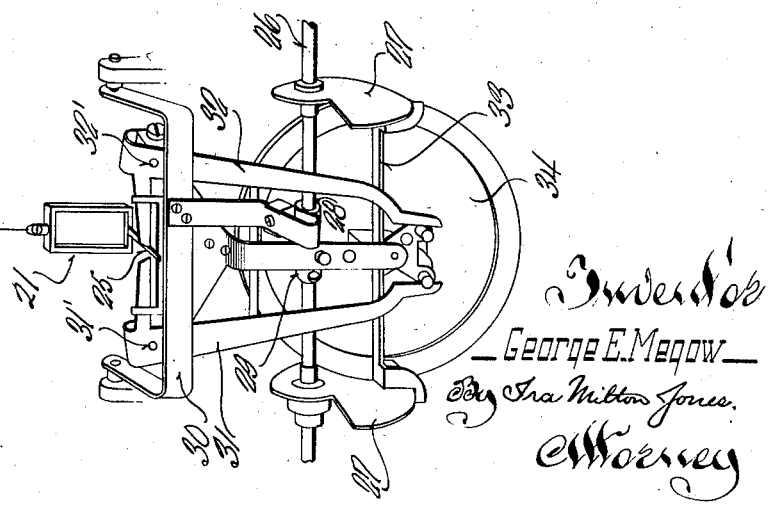
Inventor
George E. Megow
By Ira Milton Jones.

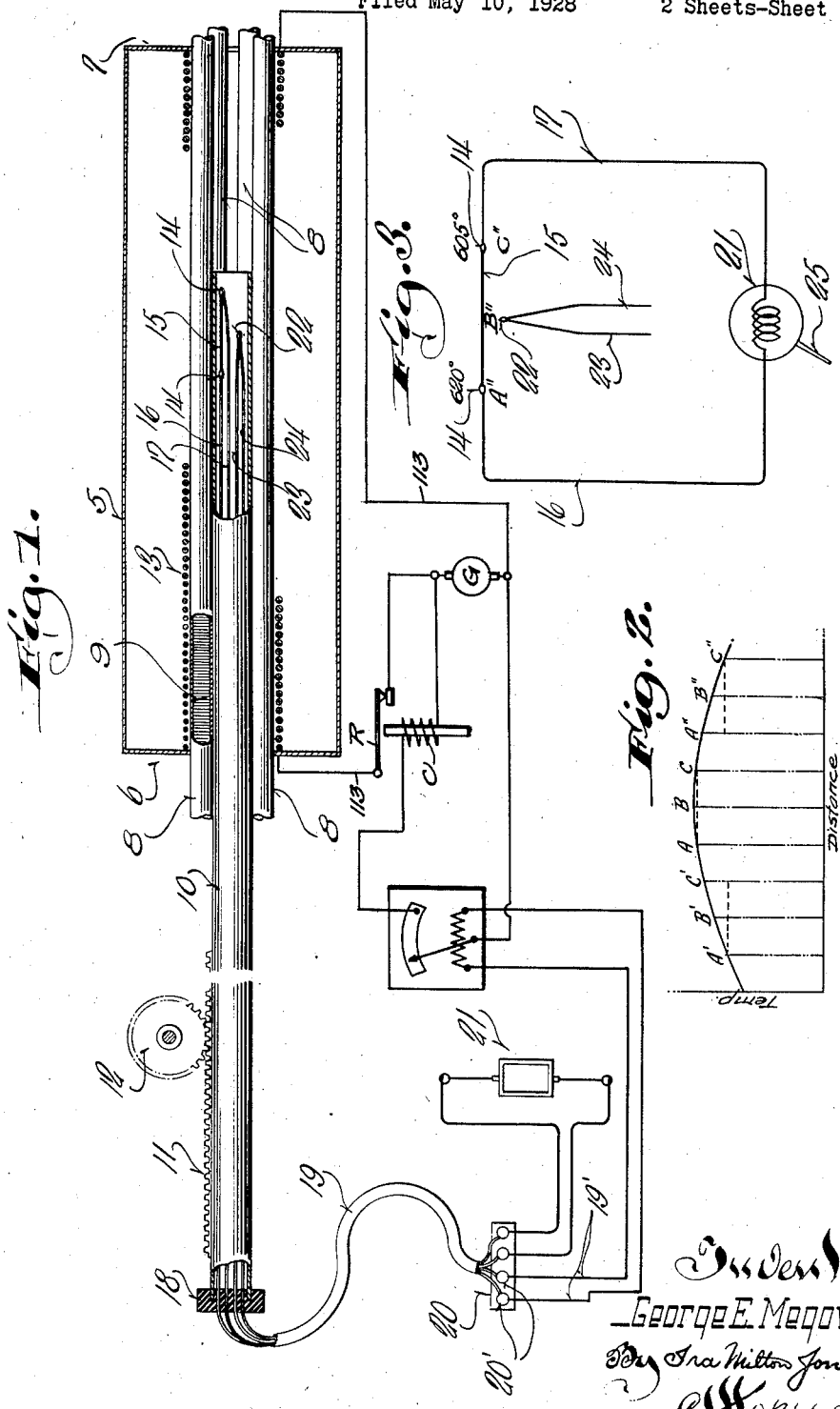

Patented July 31, 1934

1,968,534

UNITED STATES PATENT OFFICE 1,968,534

APPARATUS FOR USE IN LOCATING POINTS OF MAXIMUM OR MINIMUM TEMPERATURES

George E. Megow, South Milwaukee, Wis., assignor, by mesne assignments, to Allen-Bradley Company, Milwaukee, Wis., a corporation of Wisconsin Application May 10, 1928, Serial No. 276,607

13 Claims. (Cl. 73—32)

This invention relates to apparatus for locating points of maximum or minimum temperatures and in the disclosed embodiment refers more particularly to an apparatus applicable for use in connection with continuous ovens, furnaces and the like, to effect accurate maintenance of the oven temperature at any predetermined value.

In various types of ovens or furnaces where the material being treated moves continuously from one end thereof to the other it has been found that the point of extreme heat varies according to the nature of the particular work or material being treated and, therefore, it has been extremely difficult to maintain the temperature of the oven at any predetermined value. This has been directly caused by the inability to place the vital point or "antenna" of the temperature control unit at the point of extreme heat; therefore the present embodiment of my invention has as a primary object the provision of an apparatus for maintaining the vital point or "antenna" of a heat controlling unit at the point of extreme heat within a heated chamber wherein the point varies in location.

A further object of this invention resides in the apparatus for locating the variable point of extreme temperature in an oven or furnace of the character described by means operable by the variation.

A further object is the provision of an apparatus for maintaining a predetermined maximum temperature in a heated chamber, wherein the location of the point of maximum temperature varies, by automatically regulating the heating of the chamber from a point at the location of maximum temperature and which point moves with the point of maximum temperature to remain constantly thereat.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a diagrammatic view illustrating one application of my invention to a continuous oven;

Figure 2 is a diagrammatic view of a typical heat curve of an oven of the character described;

Figure 3 is a diagrammatic view of the balancing circuit;

Figure 4 is a perspective view of the galvanometer, directed drive mechanism, shown as in balanced position;

Figure 5 is a view similar to Figure 4 with the parts shown in their respective unbalanced position, and Figure 6 is a diagrammatic view similar to Figure 3 of a modified form of my invention.

Referring now more particularly to the accompanying drawings, in which like numerals represent like parts throughout the several views, 5 designates an oven or furnace of suitable construction having a receiving end 6 and a discharge end 7, the ends 6 and 7 being apertured to receive a plurality of tubes or passageways 8 arranged circumferentially about the longitudinal axis of the oven and defining longitudinal work passages therethrough. In the present instance the tubes 8 are adapted to receive series of resistor discs 9 to be treated at a predetermined temperature, being continuously fed through the tubes by means, not shown, the discs being thoroughly treated or cured by the time they reach the discharge end 7.

The tubes 8 are grouped about a slidably mounted tube 10 carrying a rack 11 at its outer end which meshes with a drive pinion 12 by which the position of the inner end of tube 10 is longitudinally adjusted in the oven at the dictation of balancing means, to be later described, the pinion being driven by the balancing means. An electric heating coil or other heat generating means 13 surrounds the plurality of tubes 8 to heat the oven and through its leads 113 the coil is included in series with a current source G and a switch R. The inner end portion of tube 10 suitably mounts a pair of complementary thermocouples 14, the negative arms of which are common, one with the other, being preferably formed of a single piece of constantan 15, and the positive arms 16 and 17 thereof, formed of iron wire, are insulated from each other and extend outwardly through the tube 10 passing through apertures in an insulating block 18 at the extreme outer end of the tube, to be connected with leads forming part of a flexible cable 19. The other ends of the leads are connected with a pair of contacts of a terminal block 20, the contacts being electrically connected with the sides of a balancing galvanometer 21, to be later described, whereby the positive arms of the thermocouples 14 are connected with the galvanometer.

Positioned at a medial point equi-spaced from the thermocouples 14 is a third thermocouple 22, the arms 23 and 24 of which extend outwardly through tube 10 and are connected with a second pair of leads forming part of the flexible cable 19. The leads of the couple 22 are connected with contacts 20' of the terminal block 20 with which are connected the leads 19' of a temperature control unit such as a solenoid C which controls the arm of the switch R which governs the current supplied the heating coil 13 to maintain a predetermined maximum temperature in the oven.

As heat applied at the juncture of a thermocouple generates an E. M. F. which is directly proportional to the applied heat it will be seen that if the temperature at the thermocouples 14 is the same, the E. M. F. generated by each thermocouple will be equal and in opposite directions so that the galvanometer 21 which is connected with the leads of the thermocouples will maintain a zero or balanced position.

The thermocouples 14 are therefore spaced balance members or galvanometer control means, which at all times govern the condition of the galvanometer and which in turn initiates, in a manner to be described, the operation of the drive pinion 12 to move the tube 10 and consequently all of the thermocouples to a location where the temperature at the couples 14 is alike. The thermocouple 22 which is connected by leads 19' with the temperature control unit governing the current supplied the heating coil 13 to maintain the temperature in the oven at a predetermined value is then at the point of extreme temperature, as will be later described.

In ovens of the type with which this invention deals, the point of maximum temperature is at all times located somewhere near the medial portion of the oven and the temperature on opposite sides of the zone of extreme temperature gradually and uniformly diminishes toward the ends of the oven. In other words, the temperature within the oven may be graphically represented by a relatively flat and uniform convex curve with the ends thereof representing the ends of the oven and its crest representing the zone of extreme temperature.

Figure 2 illustrates a typical heat curve of an oven of the character described which shows the maximum temperature to be at a medial point B which is equi-spaced from points A and C where the temperature is the same. If at this instant, tube 10 is so positioned that the thermocouples 14 coincide with the points A and C in the curve, the E. M. F. thereof will be equal and in opposite directions and the galvanometer which directs the longitudinal movement of tube 10 and consequently the position of the vital point or antenna 22 of the heat controlling system will be at rest at its zero or balanced position. If, however, the tube 10 and consequently the point 22 is positioned to the right of its present position or at point B'' in the curve with the thermocouples 14 at points A'' C'', the temperature at the thermocouple located at point A'' will be greater than that at point C'' and consequently a condition of unbalance exists which has been diagrammatically illustrated in Figure 3. As an example, values of 620 degrees have been assigned to the thermocouple located at point A'' and 605 degrees at point C'', the variance in these temperatures will create a corresponding differential in the value of the E. M. F. set up by the thermocouples 14 which causes a deflection of the galvanometer needle or pointer 25.

Hence it will be seen that whenever the thermocouples 14 are so positioned that the temperature to which they are subjected is equal, the temperature at the thermocouple 22 which forms the vital point or "antenna" of the control unit, will be at the point of extreme temperature and thus the control will at all times be enabled to maintain the temperature of the oven at precisely the desired value.

The deflection of the galvanometer needle 25 which is at all times proportional to the temperature differential at the thermocouples 14 is utilized to direct the movement of a mechanical unit which is now about to be described and which actuates the gear 12 to move the tube 10 and consequently thermocouples 14 to a position at which their temperature values are equal. The unit is illustrated in Figures 4 and 5 and consists of a shaft 26 which is driven at a constant speed by any desired source of power, and has fixed thereto a pair of driving cams 27, a cam 28 and a cam 29. As the drive shaft 26 rotates, its cam 28 periodically raises a pivotally mounted U shaped rocker arm 30 which lifts the galvanometer pointer 25. If at that instant the galvanometer is in its balanced position as illustrated in Figure 4, the pointer 25 is raised into the space between the adjacent ends of two right angular levers 31 and 32. If, however, as the rocker arm 30 is raised, the galvanometer is in an unbalanced position as illustrated in Figure 5 and its pointer lies under one or the other horizontal arms of the levers 31 or 32 pivoted at points 31' and 32', the pointer, as it is raised carries with it said horizontal side of one of the right angular arms and in this instance the lever 31. The resultant position of the parts of the mechanism due to this movement is shown in Figure 5.

Movement of either right angular lever tilts a cross bar or arm 33, in one direction or the other, the outer ends of which form one member of a clutch whose other member is a disc 34 carried by the same shaft to which the gear 12 is secured. The arm 33 is so mounted that it may be engaged with and disengaged from the disc 34 which movement is controlled by the cam 29. In the position illustrated in Figure 5 the cam 29 has raised the clutch faces off the cross bar out of engagement with the disc 34 and the lever 31 has tilted the cross bar, further movement of the parts from this position permitting arm 33 to re-engage its clutch ends with the disc 34 and drivingly connect the same therewith. From this position the arm 33 is moved to its original horizontal position illustrated in Figure 4 by the right driving cam 27 and as will be readily apparent, movement of the arm at this time is transmitted to the disc 34 which in turn actuates the gear 12 and hence the tube 10 to move the thermocouples in a direction required to move the vital point 22 of the control unit to the point of maximum temperature. Thus it will be seen that the deflection of the needle or pointer 25 of the galvanometer to right or left depending upon the direction of the point of maximum temperature from the then position of the vital point 22 directs the movement of the mechanical driving means which moves the vital point of the heat control either to the left or to the right to at all times maintain the same at the point of extreme temperature.

Figure 6 illustrates a diagrammatic showing of my improved apparatus of locating a point of maximum or minimum temperature using instead of thermocouples, two identical resistors 35 having the same temperature coefficient and having their adjacent sides common and connected with a ground 36, their outer or opposite sides being connected with a source of energy 37 through resistors 38. The galvanometer 21 is connected across the outer terminals of the resistors 35 and thus forms a bridge circuit, whereby a differential in temperature at the resistances 35 places the circuit in a state of unbalance, inasmuch as the resistance of the resistors 35 increases with the applied heat and, therefore, produces a deflection of the galvanometer pointer which is proportional to the degree of unbalance existing in the circuit.

While the particular embodiment disclosed in the drawings shows the device arranged to locate the point of maximum temperature it will be readily apparent that no changes are required to adapt the same to use with a device wherein a predetermined minimum temperature is to be maintained and where the term "extreme" is used in the claims it is to be understood that it refers to either the maximum or minimum temperature.

It is also to be understood that while the thermocouples used have been described as composed of iron wire and constantan, the application of the principle involved in my invention is not limited to this specific combination of metals, nor is it limited to the use of thermocouples.

From the foregoing description taken in connection with the accompanying drawings, it will be readily apparent to those skilled in the art to which an invention of this character appertains that I provide a novel and efficient apparatus of locating the point of maximum or minimum temperature and one in which said point of maximum or minimum temperature may be controlled as well as located. It will also be apparent that by my improved apparatus of locating the point of maximum or minimum temperature, the movement thereof may readily be recorded in any well known manner.

What I claim as my invention is:

1. In combination with a chamber, the temperature of which is to be maintained at a predetermined value and in which the point of extreme temperature fluctuates, spaced temperature responsive members movable within the chamber, a temperature responsive member positioned between the first members, means for simultaneously moving the temperature responsive members, and means whereby a difference in temperature at the first members actuates said means to move the first members to positions of like temperature whereby the temperature at the medially located temperature responsive member will be extreme.

2. In combination with a chamber, the temperature of which is to be maintained at a predetermined value and in which the point of extreme temperature fluctuates, spaced temperature responsive members movable within the chamber, a temperature responsive member positioned between the first members, a circuit including the first members, a galvanometer included in the circuit and having a part movable upon a difference in temperature at the first members, and means directed by the galvanometer part for moving the first members to positions of like temperature whereby the medially located temperature responsive member is maintained at the point of extreme temperature.

3. In a device of the character described, a pair of spaced temperature responsive means, means mounting said spaced temperature responsive means for movement in a substantially straight line along which the temperature varies substantially uniformly and equally in the same direction at opposite ends of a zone medially of which the point of extreme temperature is located, means for moving the spaced temperature responsive means and means whereby a difference in temperature at the spaced means causes said moving means to move the temperature responsive means in said line toward positions of like temperature.

4. In a device of the character described, spaced temperature responsive elements, means mounting said spaced temperature responsive elements for movement in substantially a straight line along which the temperature varies substantially uniformly and equally in the same direction at opposite ends of a zone medially of which a point of extreme temperature is located, means for moving said elements, and means whereby a difference in temperature at the elements controls said means to move the elements toward positions of like temperatures.

5. The combination with a device the temperature of which is to be controlled and in which the point of extreme temperature fluctuates and means for producing the desired temperature of the device, of a temperature responsive element for actuating control means adapted to control the temperature producing means, and means for maintaining the temperature responsive element at all times juxtapose the point of extreme temperature, comprising means for moving the temperature responsive element, and spaced thermo-responsive means operable upon a difference in temperature thereat for causing actuation of the moving means.

6. The combination with a device, the temperature of which is to be controlled and in which the point of extreme temperature fluctuates and means for producing the desired temperature of the device, of a temperature responsive element for actuating control means adapted to control the temperature producing means, and means for maintaining the temperature responsive element at all times adjacent the point of extreme temperature of the device, comprising spaced elements operable upon a difference in temperature thereat for producing effective electrical energy, and means controlled by said effective electrical energy for moving the temperature responsive element.

7. The combination with a device to be maintained at a predetermined temperature and wherein the point of extreme temperature fluctuates and means for producing the desired temperature, of a temperature responsive element for actuating a control unit for the temperature producing means and movable in the device, means for moving the temperature responsive element, and means operable upon the shifting of the point of extreme temperature in the device to cause the means for moving the temperature responsive element to shift the same to the point of extreme temperature.

8. In a device of the class described, a pair of movable spaced temperature responsive means, a galvanometer, a circuit including the spaced means and the galvanometer, and means controlled from the galvanometer and operable to move said spaced means, a difference in temperature at the spaced means causing the galvanometer to function and direct the movement of said second-mentioned means to move the spaced means to positions of like temperature.

9. In a device of the class described, a pair of spaced temperature responsive elements, a temperature responsive member centrally positioned between said elements, means for simultaneously moving the spaced elements and the temperature responsive member, and means operable upon a difference in temperature at the elements to cause movement of the elements and the temperature responsive member to position the temperature responsive member at a point of extreme temperature.

10. Means for locating the point of extreme temperature in an elongated zone in which the temperature varies substantially uniformly and equally in the same direction from a point medially of the ends of the zone, which comprises spaced temperature responsive elements movable along said zone, a thermo responsive element positioned therebetween and adapted to be located at the point of extreme temperature when the spaced temperature responsive elements are in balance, said thermo responsive element being movable simultaneously with the spaced temperature responsive elements, means for moving the elements along said zone, and means operable upon unbalanced temperature conditions at the spaced elements to direct the movement of the spaced elements to correct the unbalanced condition.

11. An apparatus for locating the point of extreme temperature along an axis of a device wherein the temperature along said axis and at opposite sides of a medial point of extreme temperature varies substantially uniformly and equally in the same direction, which comprises spaced temperature responsive elements movable along said axis of the device, a temperature responsive element positioned between said first elements, means for simultaneously moving the elements, and means whereby a difference in temperature at the first two spaced elements actuates said means for simultaneously moving the elements to move the first mentioned spaced elements to positions of like temperature whereby the temperature at the medially located temperature responsive element will be extreme.

12. Means for locating the point of extreme temperature in a device in which the temperature at opposite ends of a zone in which the point of extreme temperature is located varies substantially uniformly and equally in the same direction, comprising an electric circuit, spaced movable temperature responsive elements adapted to produce a current flow in said circuit as long as there is a difference in temperature at said spaced elements, thermo-responsive means positioned between the spaced temperature responsive elements and adapted to be located at the point of extreme temperature when said spaced temperature responsive elements are in positions of like temperature, and means operable upon current flow in the circuit for simultaneously moving the temperature responsive elements and the thermo-responsive means to a position at which the temperature at the spaced temperature responsive elements is equal.

13. In a device of the character described, an electric circuit, a pair of spaced temperature responsive means operable to produce current flow in the circuit upon a difference in temperature thereat, means mounting said spaced temperature responsive means for movement in substantially a straight line along which the temperature varies substantially uniformly and equally in the same direction at opposite ends of a zone medial of which the point of extreme temperature is located, means for moving said spaced temperature responsive means, and means operable upon current flowing in the circuit for effecting actuation of the moving means to move the temperature responsive means in said line toward positions of like temperature.

GEORGE E. MEGOW.